(12) United States Patent
Bryzek

(10) Patent No.: US 11,414,824 B2
(45) Date of Patent: Aug. 16, 2022

(54) WATER SURFACE DEBRIS COLLECTOR

(71) Applicant: Jarrett Bryzek, Green Bay, WI (US)

(72) Inventor: Jarrett Bryzek, Green Bay, WI (US)

(*) Notice: Subject to any disclaimer, the term of this patent is extended or adjusted under 35 U.S.C. 154(b) by 0 days.

(21) Appl. No.: 17/357,510

(22) Filed: Jun. 24, 2021

(65) Prior Publication Data

US 2021/0317628 A1 Oct. 14, 2021

Related U.S. Application Data

(60) Provisional application No. 63/157,538, filed on Mar. 5, 2021.

(51) Int. Cl.
| | | |
|---|---|---|
| E02B 15/10 | (2006.01) | |
| E02B 15/08 | (2006.01) | |
| B01D 35/05 | (2006.01) | |
| E02B 15/04 | (2006.01) | |

(52) U.S. Cl.
CPC .......... *E02B 15/0835* (2013.01); *B01D 35/05* (2013.01); *E02B 15/045* (2013.01); *E02B 15/106* (2013.01); *E02B 15/0864* (2013.01)

(58) Field of Classification Search
CPC .... E02B 15/045; E02B 15/0835; E02B 15/10; E02B 15/106; E04H 4/1263; B01D 35/05
USPC .......... 210/747.6, 776, 167.1, 167.2, 170.05, 210/170.09, 170.11, 242.1
See application file for complete search history.

(56) References Cited

U.S. PATENT DOCUMENTS

| | | | | |
|---|---|---|---|---|
| 5,207,901 | A * | 5/1993 | Ravagnan | E02B 15/048 |
| | | | | 210/242.1 |
| 5,439,600 | A * | 8/1995 | Pasoz | E04H 4/1218 |
| | | | | 210/776 |
| 2015/0129480 | A1 * | 5/2015 | Pasoz | E02B 15/106 |
| | | | | 210/242.1 |
| 2015/0247331 | A1 * | 9/2015 | Norberto, III | E04H 4/1263 |
| | | | | 210/167.1 |
| 2020/0011020 | A1 * | 1/2020 | Ceglinski | E04H 4/1263 |
| 2021/0054649 | A1 * | 2/2021 | Wang | E02B 15/10 |

FOREIGN PATENT DOCUMENTS

FR 3065469 * 10/2018

* cited by examiner

*Primary Examiner* — Christopher Upton
(74) *Attorney, Agent, or Firm* — Barry Choobin; Patent 360

(57) ABSTRACT

A float assembly that can generate its inflowing water current for collecting water surface debris in a water body. Float assembly can be mounted to a fixed structure at the water body and includes a basket supported by a pair of floats buoyant in water. The basket includes a pump housed in a perforated housing, wherein the pump can be operated to suck water through the inlet also carrying the debris into the basket. The debris of a suitable size can be retained in the basket while the water is pumped out through an outlet. The basket can be switched from an operating state i.e., submerged in water to a stowed state outside the water upon the fixed structure.

14 Claims, 15 Drawing Sheets

WATER SURFACE DEBRIS COLLECTOR

CROSS-REFERENCE TO RELATED APPLICATIONS

This application claims priority to the U.S. provisional patent application Ser. No. 63/157,538, filed on Mar. 5, 2021, which is incorporated herein by reference in its entirety.

FIELD OF INVENTION

The present invention relates to a water surface debris cleaning assembly and more particularly the present invention relates to a floating water surface debris collector.

BACKGROUND

Increasing water pollution has become a major concern all around the world. Despite taking several environmental measures trash, litter, and garbage make their way to the indispensable water bodies. The debris generally gets collected on shores and areas around the water body, for example, beaches. Such trash can harm aquatic life, wildlife, and humans.

Removing the debris from the water bodies generally requires huge infrastructure and investment. Moreover, considering the vastness of water bodies, present solutions are not enough for all kinds of water bodies. Moreover, the huge cost is also a deterrent for many in cleaning the water bodies.

Thus, a desire is there for a cost-effective assembly that can collect surface debris from water bodies.

SUMMARY OF THE INVENTION

The following presents a simplified summary of one or more embodiments of the present invention in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to a float assembly for collecting water surface debris.

It is another object of the present invention that the float assembly can be used in small water bodies.

It is still another object of the present invention that the float assembly is economical to manufacture.

It is yet another object of the present invention that the float assembly can be used unsupervised for a long duration.

It is a further object of the present invention that the float assembly is easy to install.

It is still a further object of the present invention that the float assembly requires minimal service.

It is an additional object of the present invention that the float assembly can detect water level and turn-off when the water level is low.

It is still an additional object of the present invention that the float assembly can be used to collect debris that has become trapped in stagnant waterways or hard to access points in marinas and harbors.

In one aspect, disclosed is a float assembly that can generate its inflowing water current for collecting water surface debris in a water body. Float assembly can be mounted to a fixed structure at the water body and includes a basket supported by a pair of floats buoyant in water. The basket includes a pump housed in a perforated housing, wherein the pump can be operated to suck water through the inlet also carrying the debris into the basket. The debris of a suitable size can be retained in the basket while the water is pumped out through an outlet. The basket can be switched from an operating state i.e., submerged in water to a stowed state outside the water upon the fixed structure.

These and other objects and advantages of the embodiments herein and the summary will become readily apparent from the following detailed description taken in conjunction with the accompanying drawings

BRIEF DESCRIPTION OF THE DRAWINGS

The accompanying figures, which are incorporated herein, form part of the specification and illustrate embodiments of the present invention. Together with the description, the figures further explain the principles of the present invention and enable a person skilled in the relevant arts to make and use the invention.

DETAILED DESCRIPTION

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an," and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention since the scope of the invention will be best defined by the allowed claims of any resulting patent.

Figure 1:
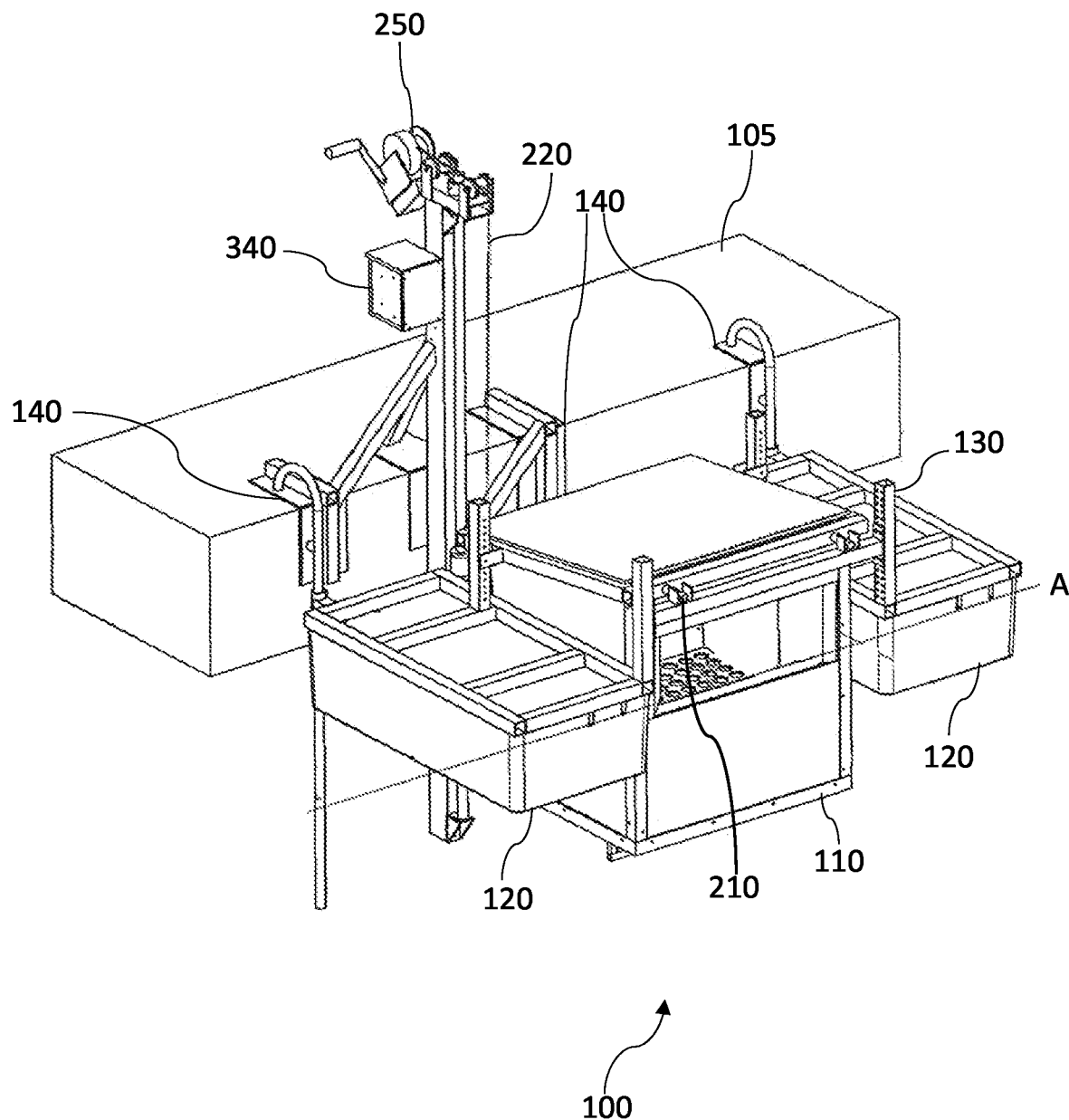
FIG. 1 is a perspective view of a float assembly installed on a dock in an operating state, according to an exemplary embodiment of the present invention.

Referring to FIG. 1 which shows the disclosed float debris collector as a cost-effective solution for eliminating unsightly marine surface debris that becomes trapped in stagnant waterways or hard to access points in marinas and harbors. Disclosed is a float assembly that can function as a giant surface skimmer designed to generate its inflowing water current to gently sweep in marine surface debris. The float assembly 100 shown in FIG. 1 can be mounted to a dock 105 at the water body and the basket of the disclosed float assembly descended in water and submerged. Line A shows the water level to which the float assembly 100 can be submerged in the operating state.

The disclosed float assembly 100 can include a basket 110, a pair of floats 120, and a frame 130 for mounting the basket 110, and a pair of floats 120. The dock can be any fixed and rigid structure at the water body to which the disclosed float assembly can be mounted. The frame 130 can include multiple base plates 140 that can be coupled to the dock structure 105. FIG. 1 shows L-shape base plates 140 that can be coupled at an upper edge of the rectangular shape dock. The float 120 allows the basket 110 to float neutrally buoyant at the perfect inflow height in the water. The basket 110 once descended in the water can then be supported by the two floats 120 with very little support from the dock. This allows mounting the disclosed float assembly 100 to less sturdy support structures as the two floats takes stress off the frame and dock, once the basket is in place and neutrally buoyant. In one exemplary embodiment, the two floats 120 can be made from roto-molded HDPE plastic filled with foam and sealed that allows for positive flotation without any maintenance. The two floats 120 can be supported by the frame 130, the frame can be aluminum weldments that may allow for height adjustments in water to fine-tune the inflow of water through the inlet of the basket. For example, the frame can allow for vertical height adjustments in water ranging from 1-4 inches.

Figure 2:
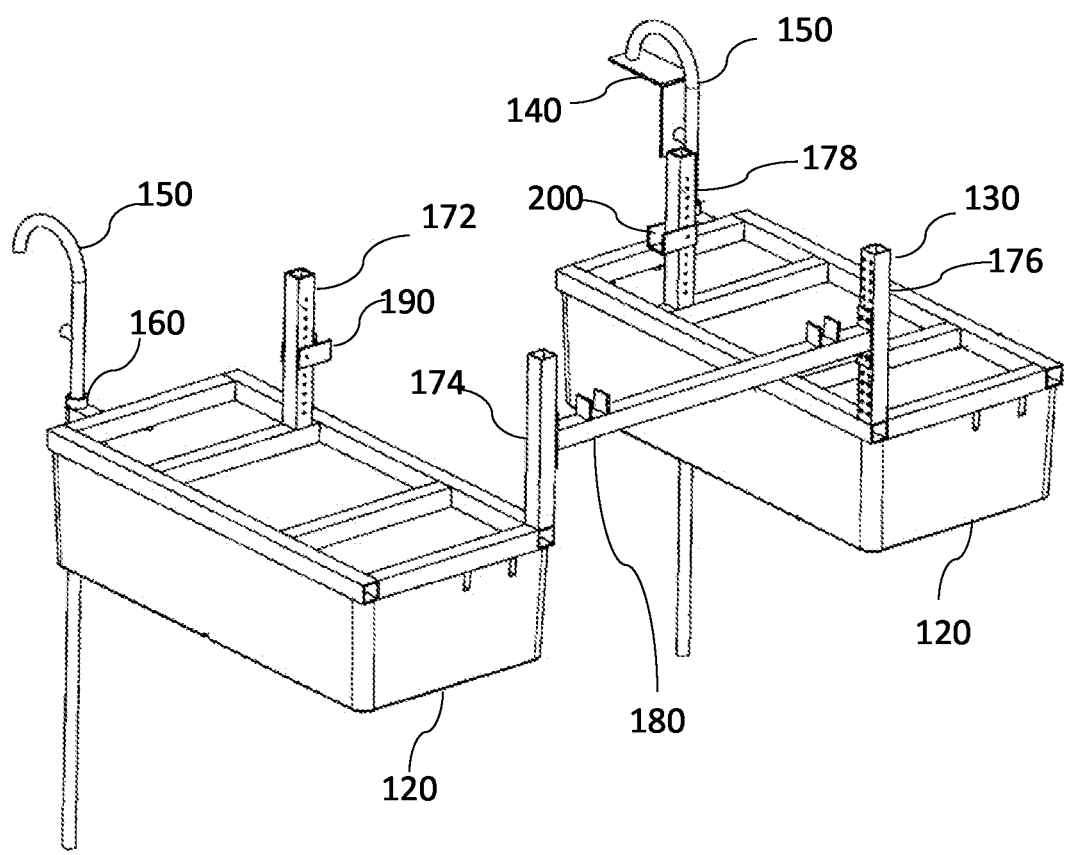
FIG. 2 shows the frame and two floats of the float assembly, according to an exemplary embodiment of the present invention.

Referring to FIG. 2 which shows the frame 130 separated from the dock and the basket. The frame 130 can include two tide bearings to which the two floats can be mounted. The tide bearings 150 can be coupled to the base plates 140 and the tide bearings can be slidably inserted into the extension 160 of the float 120. This may allow the float to move upwards and downwards with the water level in which the disclosed float assembly is submerged. The frame 130 can also include four slotted beams, the first beam 172, the second beam 174, the third beam 176, and the fourth beam 178. The first beam and the second beam are coupled to the first float and upstands from the top of the float. The third beam and the fourth beam are coupled to the second float and upstand from the top of the float. As can be seen in FIGS. 1 and 2, the four beams are adjacent to each other. A traverse horizontal support channel 180 can be coupled to the front two beams i.e., the second beam 174 and the third beam 176. The horizontal channel 180 can adjust in height relative to the two upstanding beams, wherein the second beam 174 and the third beam 176 can have spaced slots to which the horizontal support channel 180 can be coupled at different heights. The height of the horizontal support channel 180 can be adjusted at the time of installation as well as after the installation. Each of the two rear beams can also have spaced slots and two brackets can be coupled to the two beams at the slots. FIG. 2 shows the first bracket 190 coupled to the first beam 172 and the second bracket 200 coupled to the fourth beam 178. The brackets like the horizontal support channel 180 can be adjusted in the height. Perhaps, the horizontal support channel 180, the first bracket 190, and the second bracket 200 forms a nest to which the basket can be mounted. Thus, the height of the two brackets can be the same as the height of the horizontal support channel.

Figure 3:
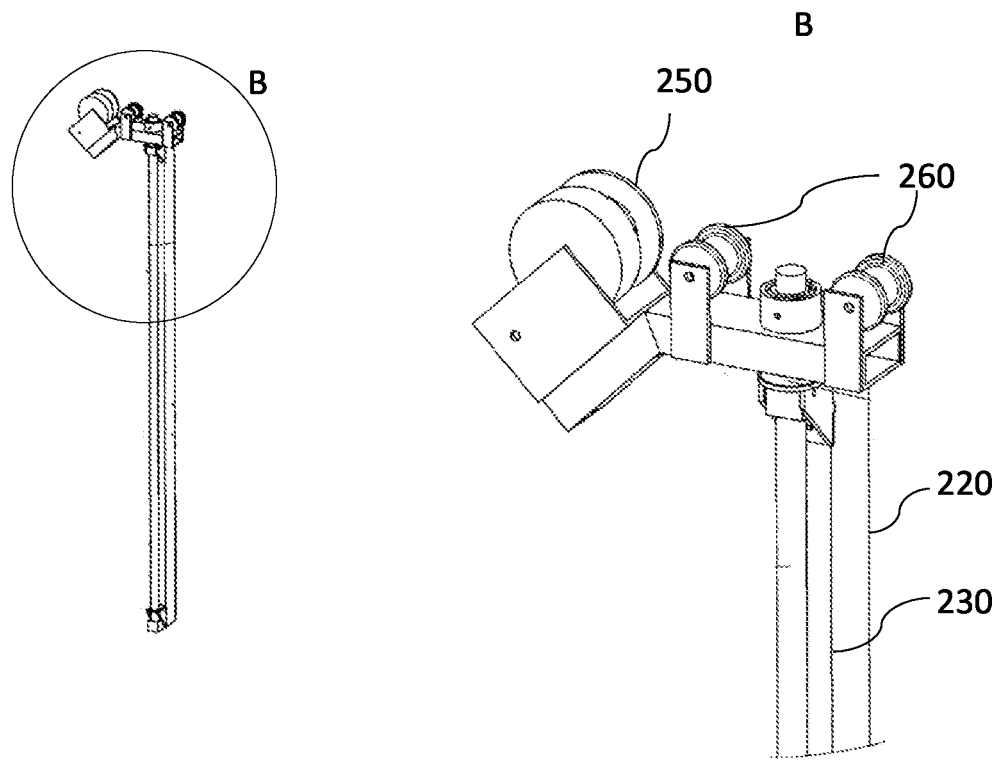
FIG. 3 shows a pillar, a pole, and a winch of the float assembly, according to an exemplary embodiment of the present invention.

The basket can have pegs along its top periphery which can mount to the nest and thus on the two floats. FIG. 1 shows two pegs 210 on one front top side of the basket which are mounted to the horizontal support channel 180. Similarly, the pegs on the opposite sides i.e., the left side and the right sides can be mounted to the two brackets for supporting the basket over the nest. It is to be understood that the pegs can be replaced by angles, plates, and like that can support the basket on a support, and any such support structure is within the scope of the present invention. Referring back to FIG. 1, the frame can also include an upright pillar 220 mounted to the two or more base plates 140. Referring to FIG. 3 which shows the pillar and the hydraulic mechanism coupled to the top of the pillar. To pillar 220 can be mounted a pole 230 that may run along with the height of the pillar.

Figure 4:
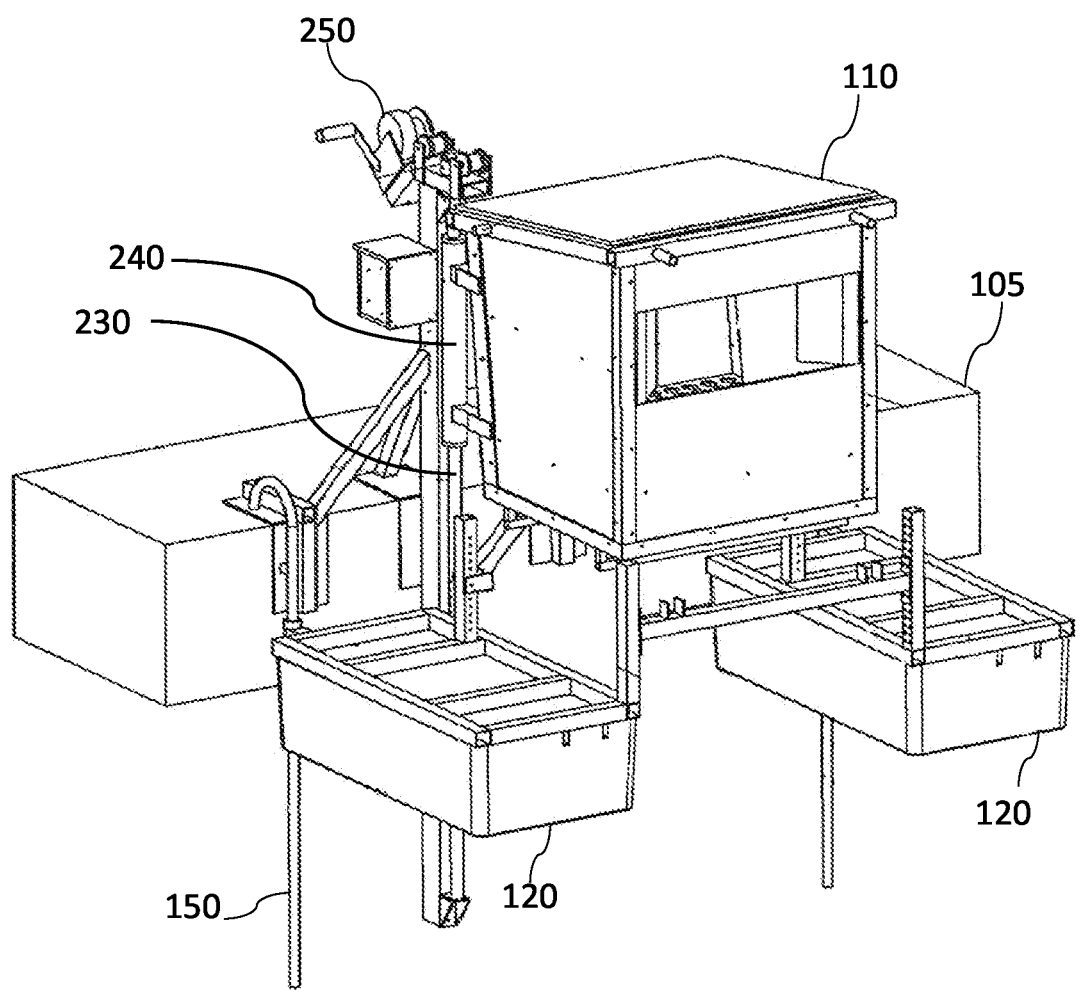
FIG. 4 shows the float assembly of FIG. 1 having the basket lifted from the water to a height of the top surface of the dock, according to an exemplary embodiment of the present invention.
Figure 5:
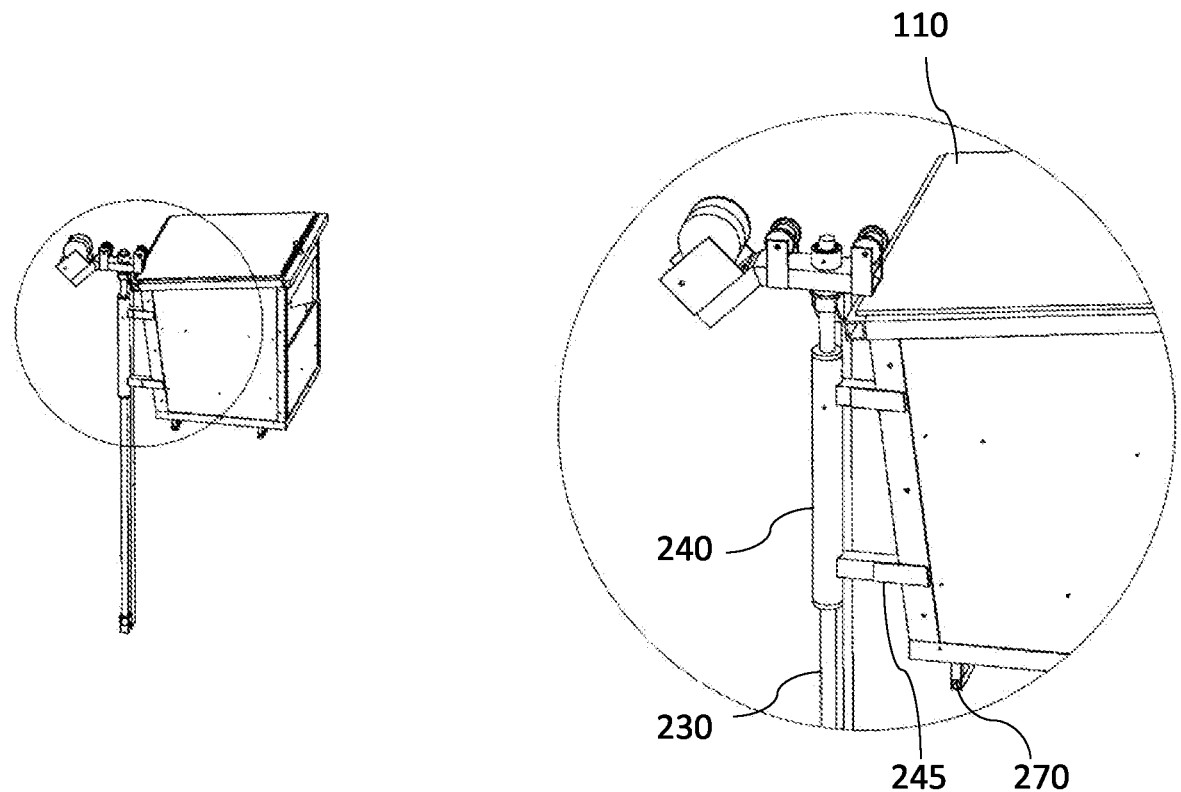
FIG. 5 is an enlarged view showing the coupling of the basket to the pole, according to an exemplary embodiment of the present invention.
Figure 6:
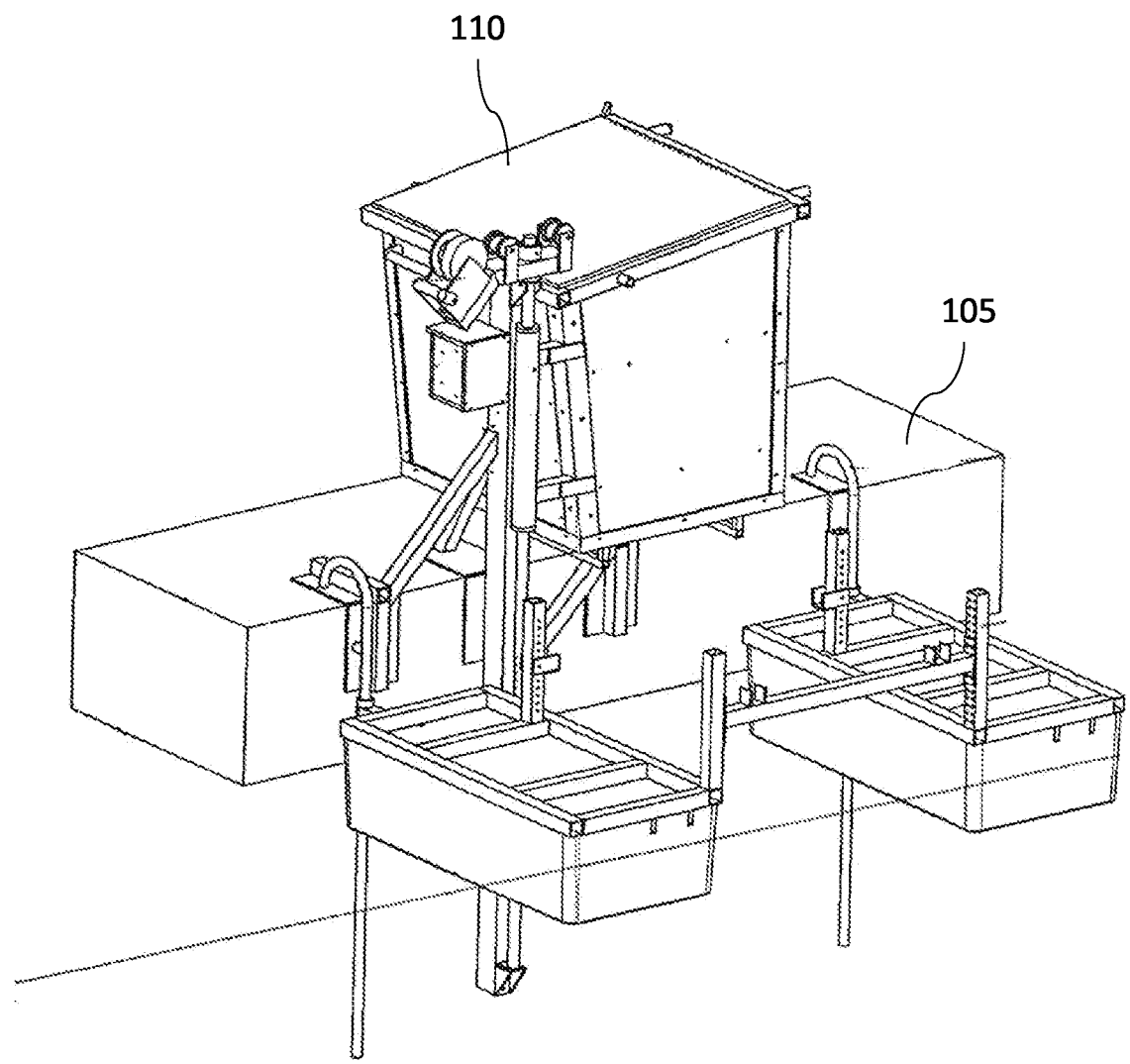
FIG. 6 shows the float assembly of FIG. 4 having the basket turned inwards and placed on the top surface of the dock, according to an exemplary embodiment of the present invention.
Figure 7:
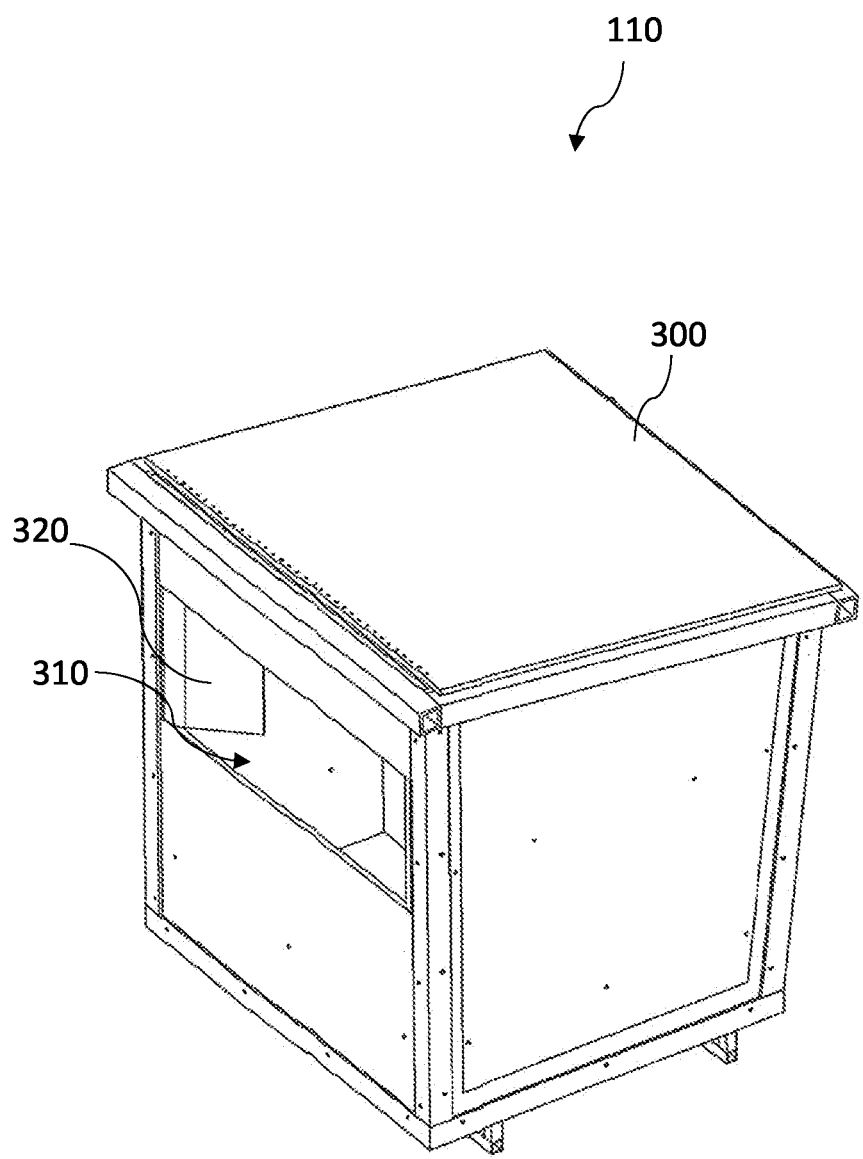
FIG. 7 is a perspective view of the basket, according to an exemplary embodiment of the present invention.
Figure 8:
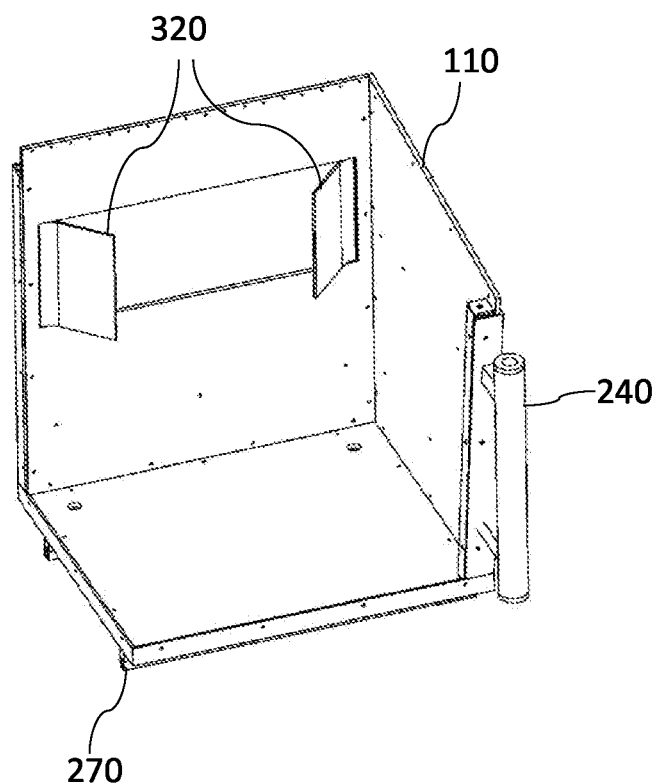
FIG. 8 shows the inlet having the pair of wings, according to an exemplary embodiment of the present invention.

Referring to FIGS. 4 and 5, wherein FIG. 4 shows the basket 110 coupled to pole 230, FIG. 5 shows an enlarged view of the basket 110 coupled to the pole 230. The basket 110 can include a linear bearing 240 that can be coupled to the basket 110 through two or more brackets 245. The linear bearing 240 can be hollow that slidably moves over the pole 230 wherein the length of the linear bearing 240 can be sufficient to support the weight of the basket over the pole 230. Referring to FIGS. 3 and 4, the hydraulic mechanism can include a winch 250 mounted at the top of the 220 pillar and connected to the basket through a cord. The winch 250 can be actuated to move the basket 110 up and down along the length of the pole 230. The cord can be routed through one or more pulleys 260 also coupled to the pillar 220. FIG. 3 shows two pulleys 260 coupled at the top of the pillar 220 over which the cord can wrap and attach to the basket 110. The winch can be manually operated through a handle coupled to the winch. Alternatively, the winch can also be actuated through an electric motor. FIG. 4 shows the winch having a handle to manually turn the winch for ascending and descending the basket. The winch can also have a suitable break that allows stopping the basket at the desired height. FIG. 1 shows the basket submerged in the water and FIG. 4 shows the basket lifted out of the water. Once at the top, as shown in FIG. 4, the basket 110 can be rotated on the pole 230. In one case, the basket can be rotated 90 degrees inwards, as shown in FIG. 4, such as the basket is over the top surface of the dock 105. Once the basket 110 is over the dock 105, the winch can be relaxed to place the basket over the dock. Thus, the winch mechanism can be used to switch the basket between an operating state and a stowed state. For service, the basket can be lifted using the winch such as the bottom of the basket is above the top surface level of the dock. FIG. 4 shows the basket 110 lifted to the desired height. Thereafter, the basket can be pulled by turning it inwards, such as the basket 110 is on the dock 105, as shown in FIG. 6. After service, the basket can again be lifted from the surface of the dock. Then the basket can be turned outwards and finally descended downwards to mount on the nest.

Figure 9:
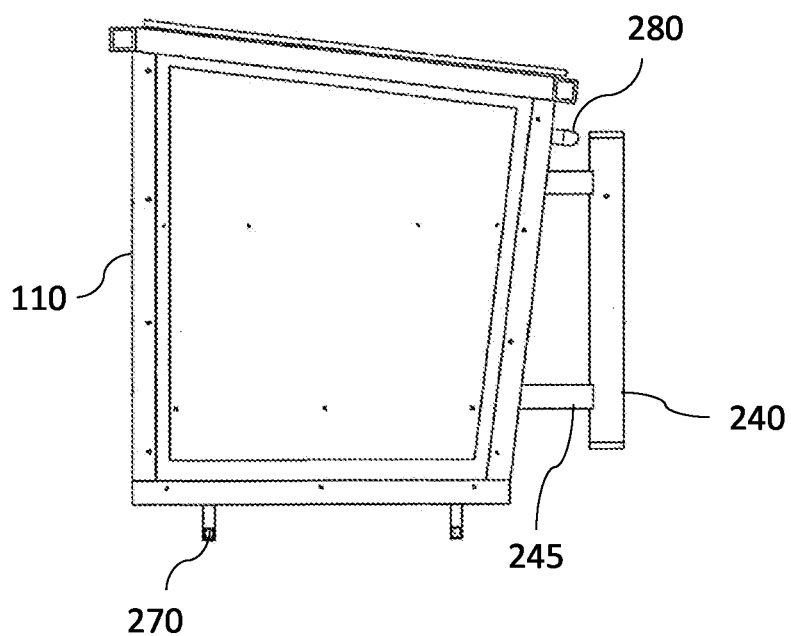
FIG. 9 shows another view of the basket, according to an exemplary embodiment of the present invention.
Figure 10:
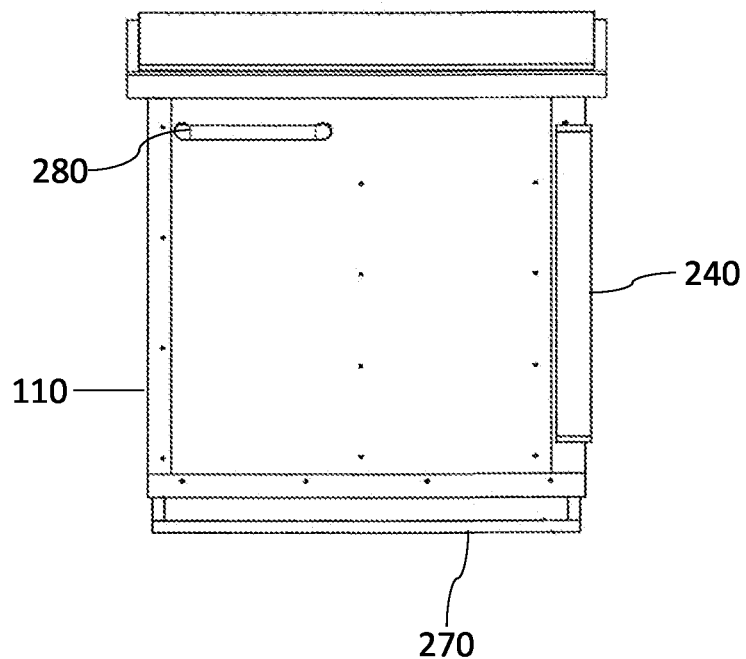
FIG. 10 shows another view of the basket, according to an exemplary embodiment of the present invention.

Referring to FIGS. 7-12 showing different aspects of the basket 110. The basket 110 can include an enclosure 300. The front of the enclosure can have an inlet door 310 for the ingress of water. As shown in FIG. 1 the basket can be submerged to a depth such as at least a lower portion of the inlet 310 can be below the water surface level for the water and the debris to ingress into the enclosure. The inlet can have a pair of wings 320 that extends from opposite sides of the rectangular shape inlet (more clearly shown in FIG. 8). The inward water pressure pushes the pair of wings inwards, wherein the pair of wings can manipulate the flow of water into the enclosure through the inlet. FIGS. 9 and 10 show the linear bearing 240 coupled to the enclosure 110 through the pair of brackets 245. The bottom of the basket can have a stand 270. The handle 280 can be used to rotate the basket both inwards and outwards on the pole, wherein the handle 280 can be grabbed by a hand. It is to be understood that the position of the linear bearing and the handle can be changed without departing from the scope of the present invention.

Figure 13:
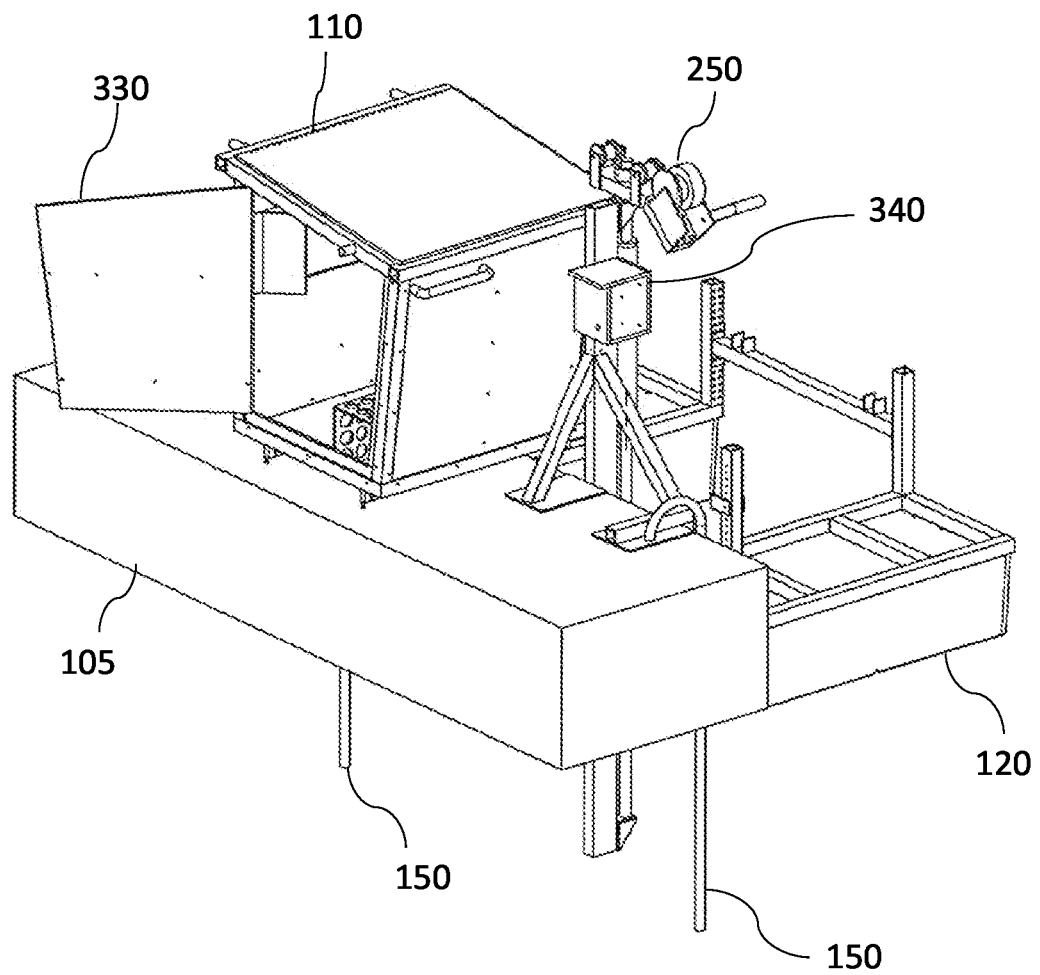
FIG. 13 shows the float assembly as in FIG. 6 in the stowed position having the service door opened, according to an exemplary embodiment of the present invention.
Figure 14:
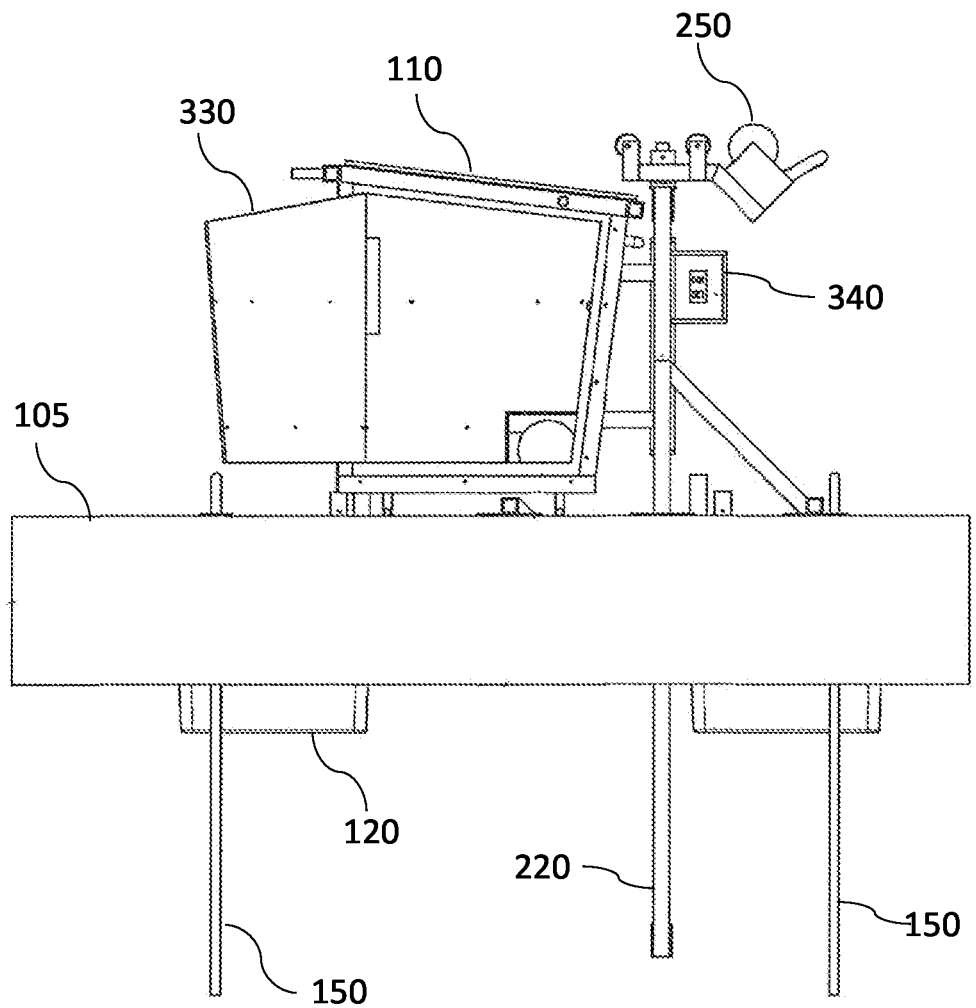
FIG. 14 shows another view of the float assembly as in FIG. 13, according to an exemplary embodiment of the present invention.

Referring to FIGS. 13 and 14, on the left side of the enclosure 110 can be provided a service door 330 that provides access to the interior of the enclosure 110. Such access to the interior may be needed for cleaning the basket. When the basket is in stowed position on the dock, the service door is accessible from behind the dock, such as a worker can easily reach the inside of the basket. FIGS. 13 and 14 show the basket in the stowed position and having the service door opened. The bottom of the enclosure can have stand 270 that allows the basket 110 to be placed on dock 105 without any harm to the enclosure from the surface of the dock. However, such stands may be optional. It can be seen that the entire interior of the basket including the pump unit can be easily accessible from the service door 330.

Figure 11:
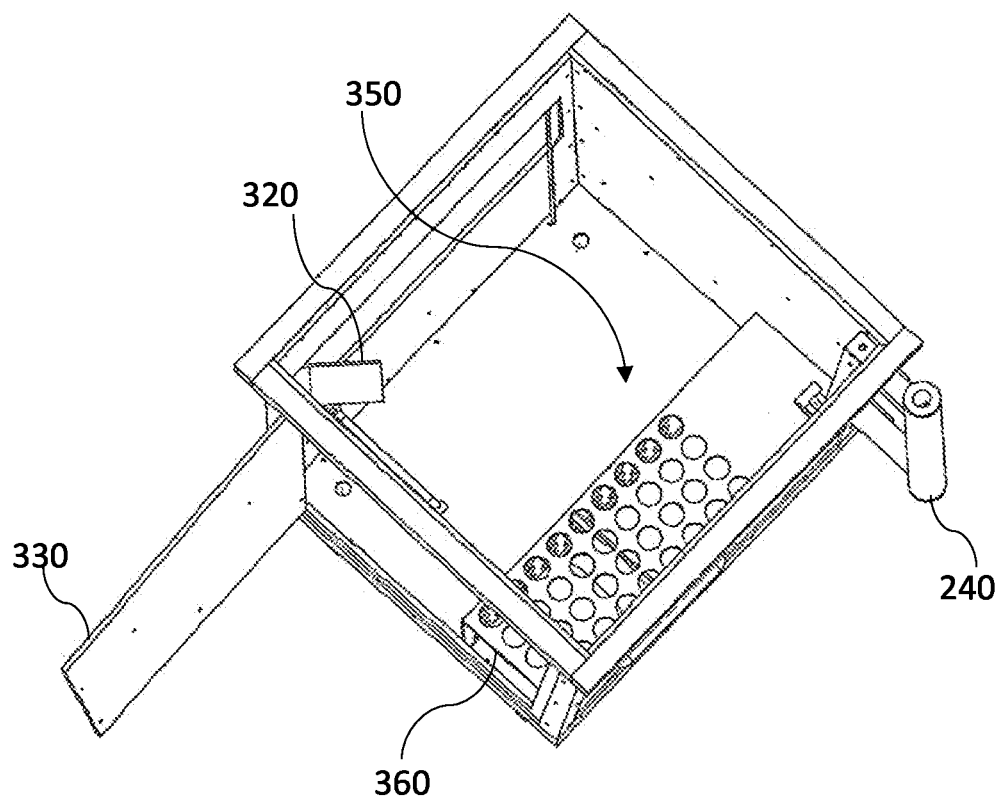
FIG. 11 is the top and side view having the top of the basket removed and the service door opened to show the interior, according to an exemplary embodiment of the present invention.
Figure 12:
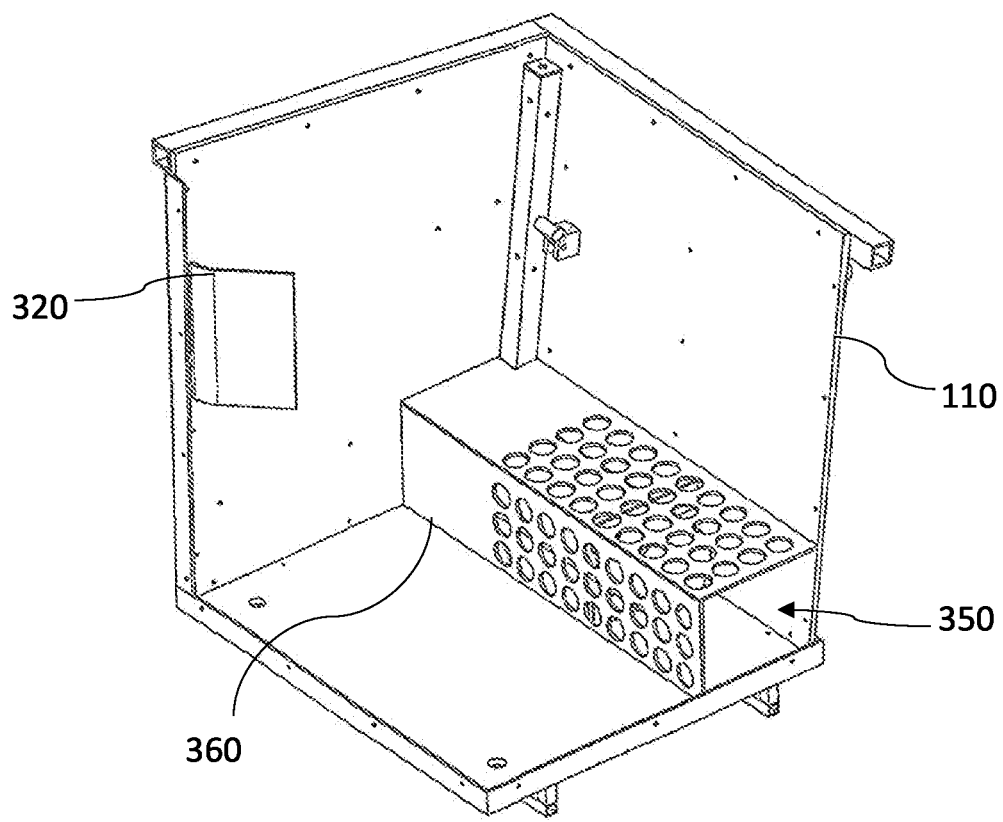
FIG. 12 shows the basket having the three sides removed to show the perforated pump assembly, according to an exemplary embodiment of the present invention.

Referring to FIGS. 11 and 12 which show the interior of the basket. For clarity, the top of the basket is removed in FIG. 11 and also the service door is opened. FIG. 12 is having the three sides of the enclosure removed to show the perforated pump housing. The basket 110 can include a pump unit 350 mounted inside the enclosure. The pump unit can include a perforated pump housing 360 enclosing an electric pump (not shown). In one exemplary embodiment, the pump can be a 150 gallon per minute self-priming stainless steel housing pump. When the basket is submerged in the water, in its operation state, the water can enter the enclosure through the inlet in front of the enclosure. The pump can push the water out through an outlet providing circulation of the water. In one case, the outlet can be provided at the bottom of the enclosure. When in use the pump can create 150 gallons per minute of suction or inflow that creates an artificial current that draws the water through the inlet from the exterior. Once water enters the basket, it works its way down to the pump and is then pumped out from an outlet in the bottom of the basket.

Figure 15:
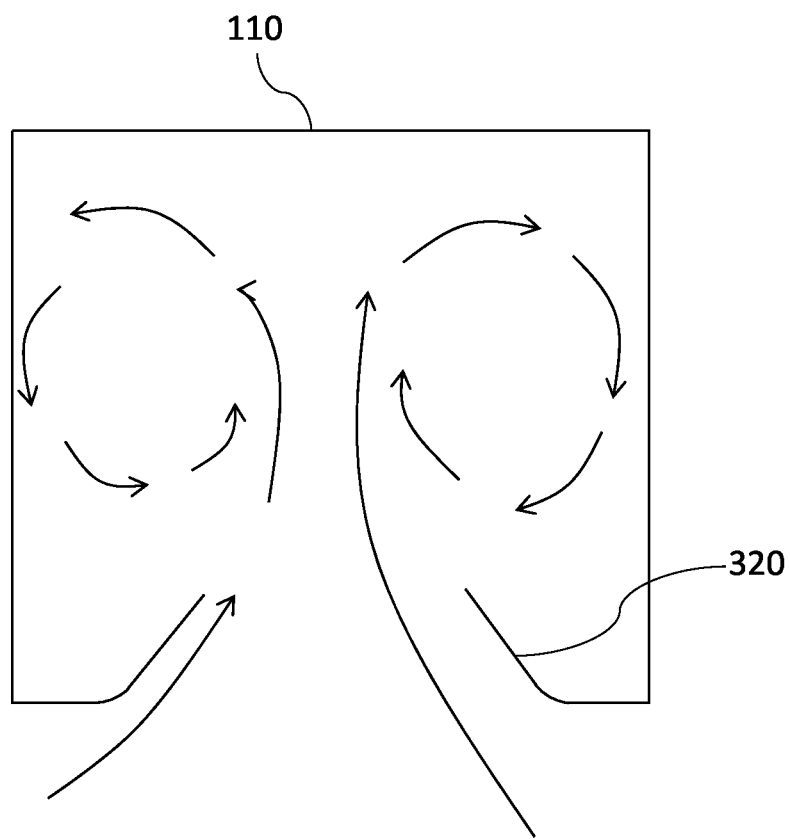
FIG. 15 illustrates an intake of water in the basket creating a whirlpool effect, according to an exemplary embodiment of the present invention.

In one exemplary embodiment, the disclosed float assembly 100 can be ideally mounted to a dock or break wall and strategically placed in a slow-moving or stagnant area of a marina. The disclosed float assembly can create an artificial surface flow by pulling in 150 gallons per minute through one or more entry points. It is to be understood that the capacity of the pump may vary and 150 gallon per minute is only an example of the pump, and the pump of different capacities are within the scope of the present invention. In one case, the inlet can be in the form of wings, preferably two adjacent wings. The wings can be made from molded plastic that effectively helps the water smoothly flow through the forward inlet opening rather than having an abrupt or sharp corner cut out or opening. The wings can then allow for less backflow of surface materials or water out of the confines of the basket as debris would need to fight its way against the inflow current as well as work its way around the inlet wings. The flow of water into the basket is illustrated in FIG. 15. As the water is pulled in a downward motion as it moves towards the rear of the basket. Over time that downward flow creates a small whirlpool effect within the confines of the enclosure of the bracket. The whirlpool effect can help hold the collected debris in place within the confines of the enclosure as long as the pump is continuously running. The inflow of water utilizing the pump creates a constant flow of water pulled in through the opening and thus drops the water level very slightly on the inside of the basket versus the water level outside of the basket. This creates a constant frictionless inflow of water from outside to replace and attempt to equalize the water level inside the basket. This creates an artificial inbound constant current. The ideal water level above the bottom of the inlet door can be approximately 3". This 3" presents the ideal inflow rate and given the dimensions of the opening lets in exactly the amount of water to be drawn by the pump of 150 gallons per minute capacity. This water height can be achieved by adjusting the basket and nest heights accordingly using the supplied adjustment holes in the beams. As the water pumped out via an outlet on the bottom of the basket below the waterline. The sinking debris is trapped from escape via a perforated pump housing 360 that acts as a barrier for all items over the desired size, such as over ¼ inches diameter. Water and items under the desired diameter may be allowed to escape via the pump exhaust.

In one exemplary embodiment, the entire float assembly 100 can be assembled on the dock. First, the base plates can be installed in a dock, preferably on the upper and front sides. The frame can then be installed, and floats can be mounted to the frame. The pillar and the pole, the pole also referred herein as a long linear bearing travel rod, can also be installed. The floats can also be installed. Thereafter, the basket can be slid onto the pole while at a 90-degree position to the water from the dock. The hydraulic system including the winch can then be installed and the winch cable can be coupled to the basket. The rotation of the basket can be limited to definite positions, for example using pins. The suitable rotational bearing pin can be used to keep the basket from moving left or right while out of the water and thus aligning it perfectly with the floats and nesting frame below. An ideal height for the inlet door can be adjusted by utilizing the nest height adjustments.

In one exemplary embodiment, the device can utilize a 30-amp shore power plug and runs on conventional 110 V electricity. A control box 340 can be provided, for example, installed on pillar 220. FIG. 1 shows the control box 340 installed on pillar 220. The control box can include a power switch that can be switched to an on position for starting the pump. The floats and the frame can be designed to move the basket up and down with variable water heights keeping the water inlet at an ideal surface level height. The float and the frame can keep the basket neutrally buoyant regardless of contents or water level change. Suitable sensors can be provided that can detect the water level drop inside of the basket due to lack of inflow. A float switch operably coupled to the sensors can be triggered automatically by the sensors for turning off the pump. Also, the power to the pump can be automatically resumed once the ideal water level height is regained and the float assembly can continue to function without any manual reset. However, the float assembly can be turned off via the off button in the control box.

Run times between cleaning services can depend on the site and the floating debris. The assembly can continue running once set up correctly and will continue to unless the unit is pulled from the water, turned off manually, or if the water level sensor shuts down the pump due to low interior water levels. If a cleanout is needed the user can simply keep the pump running, winch the basket up above the floating nest. Then turn the pump off, pull the rotational pin out of the bearing and rotate the basket onto the dock. The hinged service door on the side of the basket can be opened and all contents can be extracted for disposal. Proper cleaning and pump service can also be performed at this time by removing the perforated pump housing to gain access to the pump itself. The process for putting the basket back in the water may involve shutting the service door, rotating the basket over the surface of the water, placing the rotational pin back in the bearing, lowering the basket down onto the nest of the frame (the basket will fill with water through the drain hole in the bottom) and once seated on to nest, the pump can be turned on again to create inflow.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A float assembly for collecting water surface debris in a water body, the float assembly comprising:
   a first float and a second float configured to float in water;
   a basket; and
   a frame coupled to the first float, the second float, and the basket, wherein the frame is configured to mount the first float, the second float, and the basket to a fixed structure, the frame comprises a nest coupled to the first float and the second float, the nest configured to mount the basket in a submerged state, the frame configured to switch the basket between the submerged state and a stowed state, in the stowed state the basket is placed upon the fixed structure,
   wherein the basket comprises:
      an enclosure having an inlet and an outlet for water, the inlet positioned such as when the basket is submerged in the water, the water enters into the enclosure through the inlet,
      a perforated pump housing enclosed in the enclosure, the perforated pump housing configured to retain debris of a size larger than a predefined size, and
      a pump encased within the perforated pump housing and in fluid communication with an interior of the enclosure and the outlet, the pump configured to draw water from the enclosure and pump through the outlet.

2. The float assembly according to claim 1, wherein the outlet in positioned in a bottom of the enclosure such as the outlet is submerged when the basket is submerged.

3. The float assembly according to claim 1, wherein the frame comprises a plurality of base plates configured to mount to the fixed structure.

4. The float assembly according claim 3, wherein the frame further comprises a first tide bearing and the second tide bearing both coupled to the plurality of base plates, wherein first tide bearing configured to slidably mount the first float, and the second tide bearing configured to slidably mount the second float.

5. The float assembly according to claim 1, wherein the frame further comprises:
   a first beam, a second beam, a third beam, and a fourth beam,
   the first beam and the second beam upstands from the first float, the third beam and the fourth beam upstands from the second float, the first beam, the second beam, the third beam, and the fourth beam are adjacent to each other,
   a horizontal support channel coupled to the second beam at one end and the third beam at opposite end,
   a first bracket coupled to the first beam, and
   a second bracket coupled to the fourth beam,
   wherein the horizontal support channel, the first bracket, and the second bracket forms the nest.

6. The float assembly according claim 5, wherein the first beam, the second beam, the third beam, and the fourth beam are having spaced slots, wherein the horizontal support channel, the first bracket, and the second bracket are coupled at the spaced slots permitting the adjustment of height of the nest.

7. The float assembly according to claim 5, wherein the frame further comprises:
   an upstanding pillar, and a pole coupled to the pillar and running along the length of the pillar, wherein the basket is slidably and rotatably coupled to the pole, wherein the float assembly further comprises a winch coupled to top of the pillar and a winch cord attached to the basket, wherein the winch configured to ascend and descend the basket.

8. The float assembly according claim 5, wherein the length of the pole is such that the basket can be lifted above a top surface level of the fixed structure, wherein the basket further comprises a linear bearing coupled to the enclosure, wherein the linear bearing slid over the pole, the linear bearing configure to permit about 90 degrees rotation of the basket inward over the fixed structure.

9. The float assembly according to claim 5, wherein the first float, the second float, and the nest configured to keep the submerged basket buoyant in the water.

10. The float assembly according to claim 8, wherein the basket further comprises a service door providing access to the interior of the basket, the service door positioned at a side adjascent a front side having inlet, wherein the service door faces the fixed structure when the basket is in the stowed state.

11. The float assembly according to claim 1, wherein the inlet is having a left side and a right side, the left side having a first wing, the right side having a second wing, the first wing and the second wing configured to pivot outwards closing the inlet and pivot inwards under the pressure of inbound water, wherein the first wing and the second wing manipulates a path of the inbound water.

12. The float assembly according to claim 1, wherein the float assembly further comprises a float sensor configure to detect water level, the float sensor operably coupled to a power supply of the float assembly and configured to turn the power supply off when the water level is below a predetermined level and upon regaining the predetermined water level turning the power supply on.

13. A method of cleaning water surface debris from a water body, the method comprising the steps of:
mounting a float assembly to a fixed structure at the water body, the float assembly comprises:
a first float and a second float configured to float in water,
a basket,
a frame coupled to the first float, the second float, and the basket, wherein the frame is configured to mount the first float, the second float, and the basket to the fixed structure, the frame comprises a nest coupled to the first float and the second float, the nest configured to mount the basket in a submerged state, the frame configured to switch the basket between the submerged state and a stowed state, in the stowed state the basket is placed upon the fixed structure, the frame further comprises a pillar,
wherein the basket comprises:
an enclosure having an inlet and an outlet for water, the inlet positioned such as when the basket is submerged in the water, the water enters into the enclosure through the inlet,
a perforated pump housing enclosed in the enclosure, the perforated pump housing configured to retain debris of a size larger than a predefined size, and
a pump encased within the perforated pump housing and in fluid communication with an interior of the enclosure and the outlet, the pump configured to draw water from the enclosure and pump through the outlet, and
a winch coupled to a pillar, a winch cord attaches to the basket,
wherein the winch is configured to ascend and descend the basket;
descending the basket into the water, wherein the basket in mounted over the nest and submerged; and
turning the pump on to generate an inbound water current, wherein water is drawn into the basket from the water body through the inlet and pumped through the outlet, wherein the debris is retained in the basket.

14. The method according to claim 13, wherein the method further comprises the steps of:
actuating the winch to lift the submerged basket above a top surface level of the fixed structure;
turning the basket inwards over the fixed structure by rotating about 90 degrees;
removing debris from the basket;
upon removing the debris, turning the basket outwards;
upon turning the basket outwards, actuating the winch to lower the basket over the nest and submerged.

* * * * *